(12) United States Patent
Kanegae et al.

(10) Patent No.: US 10,807,549 B2
(45) Date of Patent: Oct. 20, 2020

(54) SAFETY APPARATUS FOR VEHICLE

(71) Applicant: SUBARU CORPORATION, Tokyo (JP)

(72) Inventors: Shota Kanegae, Tokyo (JP); Toru Yamashita, Tokyo (JP); Kenshi Eda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 51 days.

(21) Appl. No.: 16/202,812

(22) Filed: Nov. 28, 2018

(65) Prior Publication Data

US 2019/0299893 A1  Oct. 3, 2019

(30) Foreign Application Priority Data

Mar. 28, 2018 (JP) ................................ 2018-061874

(51) Int. Cl.
*B60R 21/0134* (2006.01)
*B60R 19/20* (2006.01)
(Continued)

(52) U.S. Cl.
CPC ........ *B60R 21/0134* (2013.01); *B60R 19/205* (2013.01); *B60R 21/36* (2013.01);
(Continued)

(58) Field of Classification Search
CPC .... B60R 21/0134; B60R 21/36; B60R 19/205
See application file for complete search history.

(56) References Cited

U.S. PATENT DOCUMENTS 3,563,594 A * 2/1971 London ................. B60J 11/025
293/128
5,845,937 A   12/1998 Smith
(Continued)

FOREIGN PATENT DOCUMENTS

DE   10 2015 009884 A1   2/2017
EP      2 894 067 A1   7/2015
(Continued)

OTHER PUBLICATIONS

Japanese Office Action dated Sep. 24, 2019 for Japanese Patent Application No. 2018-061874 (6 pages in Japanese with English Translation).

*Primary Examiner* — Faye M Fleming
(74) *Attorney, Agent, or Firm* — Smith, Gambrell & Russell, LLP

(57) ABSTRACT

A safety apparatus for a vehicle includes a structure, an inflator, a collision position detector, and a deployment controller. The structure extends along an outer periphery of the vehicle, and includes a plurality of partial structures. The inflator is configured to supply gas into the structure. The collision position detector is configured to detect or predict a collision position the vehicle upon colliding against an object. The deployment controller is configured to control gas supply from the inflator to the structure, based on a collision position detected or predicted by the collision position detector. The deployment controller causes the inflator to supply the gas to a partial structure corresponding to the collision position to deform at least the corresponding partial structure outward in a vehicle width direction.

18 Claims, 10 Drawing Sheets

(51) Int. Cl.
   *B60R 21/36* (2011.01)
   *B60R 21/00* (2006.01)
(52) U.S. Cl.
   CPC ................ *B60R 2021/0004* (2013.01); *B60R 2021/0006* (2013.01)

(56) References Cited

U.S. PATENT DOCUMENTS

| | | | | |
|---|---|---|---|---|
| 7,232,001 | B2 * | 6/2007 | Hakki | B60R 19/205 |
| | | | | 180/271 |
| 7,344,151 | B2 * | 3/2008 | Sonoda | B60R 21/16 |
| | | | | 280/730.1 |
| 7,806,221 | B2 * | 10/2010 | Mishra | B60R 19/205 |
| | | | | 180/271 |
| 8,172,027 | B2 * | 5/2012 | Mishra | B60R 19/205 |
| | | | | 180/271 |
| 9,457,763 | B2 * | 10/2016 | Takenaka | B60R 21/36 |
| 10,239,478 | B2 * | 3/2019 | Churchwell, II | B60R 19/40 |
| 10,308,212 | B2 * | 6/2019 | Wu | B60R 21/36 |
| 2003/0155750 | A1 | 8/2003 | Hu et al. | |
| 2006/0169517 | A1 | 8/2006 | Mishra | |
| 2011/0048835 | A1 | 3/2011 | Mishra | |

FOREIGN PATENT DOCUMENTS

| | | |
|---|---|---|
| JP | 2000-168473 | 6/2000 |
| JP | 2005-537165 A | 12/2005 |
| JP | 2008-526593 A | 7/2008 |
| WO | 01/85527 A1 | 11/2001 |

\* cited by examiner

SAFETY APPARATUS FOR VEHICLE

The present application claims priority from Japanese Patent Application No. 2018-061874 filed on Mar. 28, 2018, the entire contents of which are hereby incorporated by reference.

BACKGROUND

1. Technical Field

The present invention relates to a safety apparatus for a vehicle.

2. Related Art

A safety apparatus for a vehicle has been proposed to absorb the impact of a collision of a moving vehicle with an object such as a pedestrian. With this safety apparatus for a vehicle, when a collision with an object such as a pedestrian is detected or predicted, an airbag built in a bumper is deployed from the upper surface of the bumper in the front of the vehicle, so as to effectively absorb the impact of the collision with the object, which is disclosed, for example, in Japanese Unexamined Patent Application Publication No. 2000-168473.

SUMMARY OF THE INVENTION

An aspect of the present invention provides a safety apparatus for a vehicle including: a structure extending along an outer periphery of the vehicle, and including a plurality of partial structures; an inflator configured to supply gas into the structure; a collision position detector configured to detect or predict a collision position of the vehicle upon colliding against an object; and a deployment controller configured to control gas supply from the inflator to the structure, on a basis of the collision position detected or predicted by the collision position detector. The deployment controller causes the inflator to supply the gas to one or more of the partial structures corresponding to the collision position to deform at least the one or more corresponding partial structures outward in a vehicle width direction.

DETAILED DESCRIPTION

Figure 1:
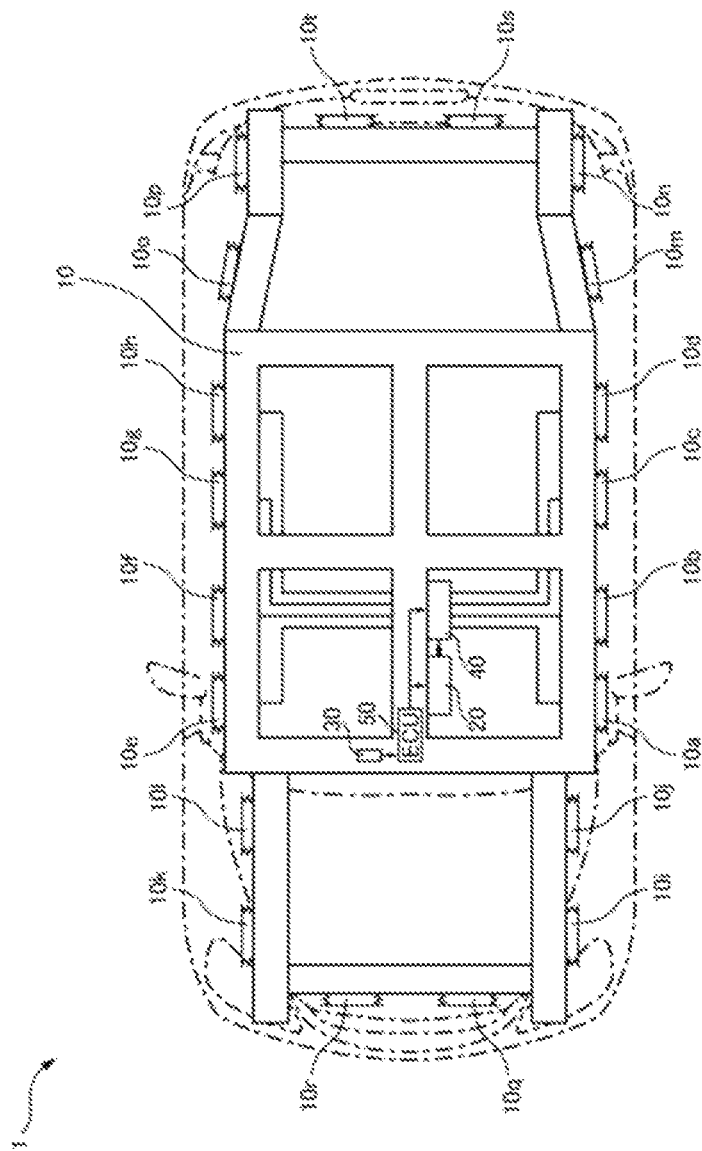
FIG. 1 is a schematic view illustrating an exemplary vehicle equipped with a safety apparatus according to an example of the present invention.

In the following, some implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the technology are optional and may be provided on an as-needed basis. Throughout the present specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

A collision of the vehicle is not limited to a frontal collision, but various types of collisions such as a lateral collision are conceivable. Therefore, in order to cope with collisions in all directions, for example, an impact absorber capable of deploying to entirely cover the vehicle frame is provided, and an inflator may be provided to deploy this impact absorber. Then, when a collision with an object is detected or predicted, the impact absorber is deployed by using the inflator to absorb the impact of the collision with the object. However, this absorber has a problem of the inflator, that is, the volume of the inflator needs to be increased or a large number of inflators are required, because the inflator needs to deploy the absorber so as to entirely cover the frame.

It is desirable to provide a safety apparatus for a vehicle capable of effectively absorbing the impact of a collision with an object over a wide range by using a compact inflator.

<Configuration of Vehicle 1>

First, the configuration of the vehicle 1 equipped with a safety apparatus according to an implementation of the present invention will be described. FIG. 1 is a schematic view illustrating an exemplary vehicle 1 equipped with the safety apparatus according to the implementation of the present invention.

As illustrated in FIG. 1, the vehicle 1 includes a structure 10, an inflator 20, a collision position detector 30, a selector 40, and a vehicle controller (hereinafter referred to as "ECU") 50. Here, the collision position detector 30 may be included in the ECU 50. With the present implementation, the safety apparatus includes the structure 10, the inflator 20, the collision position detector 30, the selector 40, and the ECU 50.

The structure 10 is a frame forming the skeleton of the vehicle 1. The structure 10 extends, for example, along the outer periphery of the vehicle 1. In addition, the structure 10 includes a plurality of partial structures 10*a* to 10*t*. The inflator 20 is configured to supply gas into the structure 10. To be more specific, the inflator 20 is configured to supply gas to the partial structures 10*a* to 10*t* to deploy the partial structures 10*a* to 10*t*.

The collision position detector 30 is configured to detect and predict the position of the vehicle 1 colliding with an object. The collision position detector 30 is configured to detect and predict which of the partial structures 10*a* to 10*t* corresponds to the collision position. When the collision position corresponds to more than one of the partial structures 10a to 10t, the collision position detector 30 also detects and predicts the magnitude of the collision at the point corresponding to each of the partial structures 10a to 10t.

The selector 40 is configured to select the destination of the gas supply from the inflator 20, from among the partial structures 10a to 10t. Here, in FIG. 1, a gas line to supply the gas from the selector 40 to the partial structures 10a to 10t is illustrated for the partial structures 10a to 10h, but is omitted for the partial structures 10i to 10t.

The ECU 50 is configured to entirely control the vehicle 1. In addition, the ECU 50 includes a CPU (central processing unit), a ROM (read only memory) configured to store a control program executed by the CPU, a data table, various commands and data, a RAM (random access memory) configured to temporarily store the data, an EEPROM (electrically erasable And programmable read only memory) which is a rewritable non-volatile memory, and an I/O interface circuit, for overall control of the vehicle 1.

The ECU 50 controls the selector 40 to select the destination of the gas supply, based on the collision position detected or predicted by the collision position detector 30. In this way, in one implementation, the selector 40 and the ECU 50 may serve as "a deployment controller" to control the gas supply from the inflator 20 to the partial structures 10a to 10t, based on the collision position detected or predicted by the collision position detector 30.

<Configuration of Partial structures 10a to 10t>

Figure 2A:
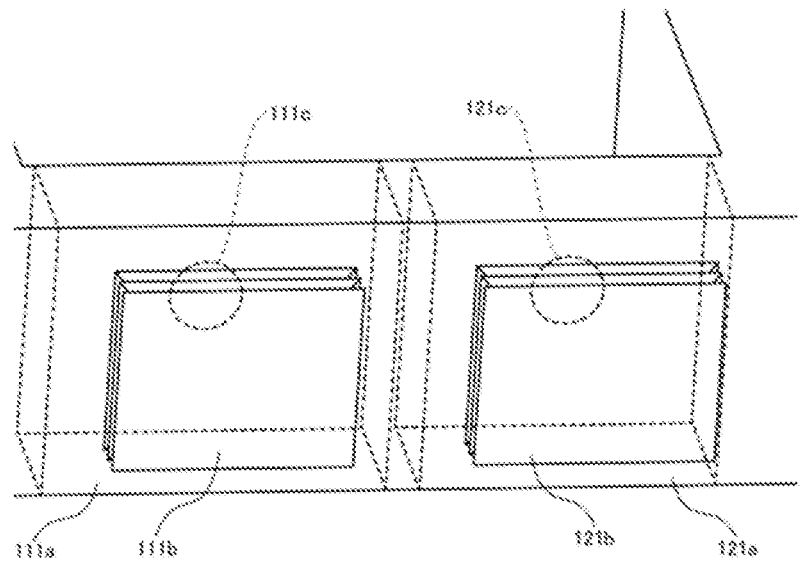
FIGS. 2A-2B are perspective views illustrating partial structures according to an example of the present invention.
Figure 2B:
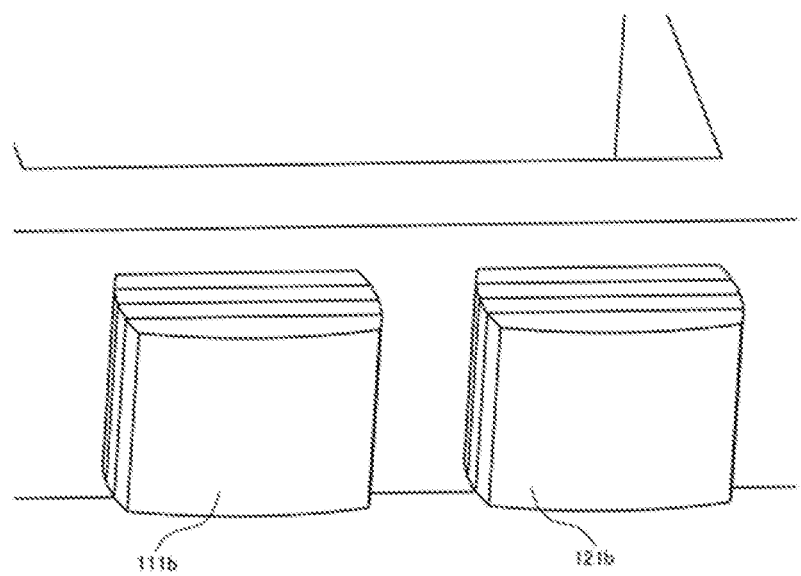

Next, the configuration of the partial structures 10a to 10t will be described. Here, each of the partial structures 10a to 10t has the same configuration, and therefore the partial structures 10a and 10b will be mainly described, and the description of the other partial structures 10c to 10t is omitted unless otherwise needed. FIGS. 2A-2B are perspective views illustrating the partial structures 10a and 10b according to the implementation of the present invention.

As illustrated in FIGS. 2A-2B, the partial structure 10a includes a partial structure chamber 111a. A partial structure deformation part 111b is attached to the partial structure chamber 111a, and a gas supply hole 111c is formed in the partial structure chamber 111a.

The partial structure chamber 111a is part of the structure 10 as an independent room. In addition, an opening is formed in the side surface of the partial structure chamber 111a, which faces the outer periphery of the vehicle 1, and the gas supply hole 111c is formed in the opposite side surface in which the opening is formed.

The partial structure deformation part 111b is provided to close the opening of the partial structure chamber 111a. In FIGS. 2A and 2B, upper lower, right and left sides of the partial structure deformation part 111b are formed like bellows so that the partial structure deformation part 111b can expand and compress. The bellows of the partial structure deformation part 111b are normally closed. However, when the gas is supplied to the partial structure chamber 111a and the pressure in the partial structure chamber 111a is increased, the bellows expand and substantially protrude outward from the partial structure chamber 111a in the vehicle width direction. The partial structure deformation part 111b is configured to be able to protrude over the outer periphery of the vehicle 1 to outside the vehicle 1 when it is deformed.

As described above, the gas supply hole 111c is formed in the side surface of the partial structure chamber 111a facing the side surface in which the partial structure deformation part 111b is provided. The gas supply hole 111c is coupled to the selector 40 via a gas supply line. Accordingly, the gas is outputted from the inflator 20 and then the destination of the gas supply is selected by the selector 40, so that it is possible to supply the gas to the partial structure chamber 111a via the gas supply hole 111c.

Like the partial structure 10a, the partial structure 10b includes a partial structure chamber 121a. A partial structure deformation part 121b is attached to the partial structure chamber 121a, and a gas supply hole 121c is formed in the partial structure chamber 121a.

The partial structure chamber 121a, the partial structure deformation part 121b, and the gas supply hole 121c are the same as the partial structure chamber 111a, the partial structure deformation part 111b, and the gas supply hole 111c of the partial structure 10a, respectively, and therefore the description is omitted.

<Change in Shape of Partial Structures 10a and 10b>

The change in shape of the partial structures 10a and 10b having the above-described configuration will be described.

When the gas is outputted from the inflator 20, and then the destination of the gas supply is selected by the selector 40 controlled by the ECU 50 to supply the gas to the partial structure 10a and 10b, the gas outputted from the selector 40 is supplied to the partial structure chambers 111a and 121a via the gas supply holes 111c and 121c.

When the gas is supplied to the partial structure chambers 111a and 121a, the pressure in the partial structure chambers 111a and 121a is increased to press the partial structure deformation parts 111b and 121b.

When the pressure in the partial structure chambers 111a and 121a is equal to or higher than a predetermined value, the bellows of the partial structure deformation parts 111b and 121b expand, so that the partial structure deformation parts 111b and 121b are deformed outward in the vehicle width direction. Thus, the partial structure deformation parts 111b and 121b blow up and protrude from the outer periphery of the vehicle 1.

Here, as illustrated in FIG. 2B, the shape of each of the partial structure deformation parts 111b and 121b may be changed to curve such that an approximate center of the partial structure deformation part is raised. Alternatively, the side surfaces of the partial structure deformation parts 111b and 121b may be translated.

<Motion of Safety Apparatus in Collision with Pole>

Figure 3:
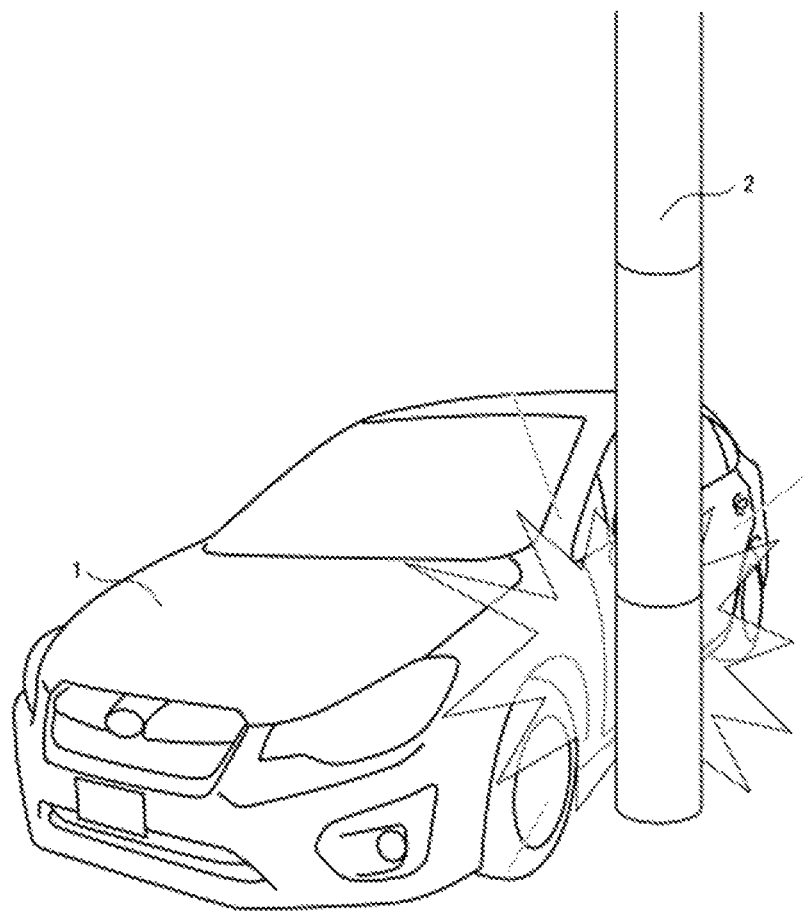
FIG. 3 is a perspective view illustrating a state where a vehicle collides with a pole.
Figure 4:
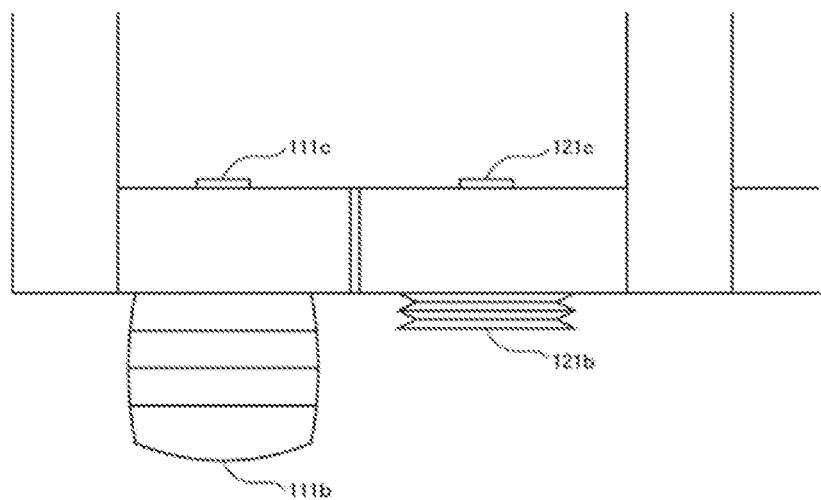
FIG. 4 is a plan view illustrating part of the structure when a targeted partial structure is actuated.

Next, the motion of the safety apparatus when the vehicle 1 collides with an object will be described. Here, a case where the vehicle 1 collides with a street lamp or a pole will be described. Here, FIG. 3 is a perspective view illustrating a state where the vehicle 1 collides with a pole 2. FIG. 4 is a plan view illustrating part of the structure 10 when the targeted partial structure 10a is actuated.

As illustrated in FIG. 3, the vehicle 1 collides with the pole at a certain point of the vehicle 1. With the present implementation, note that the vehicle 1 collides with the pole 2 at a point on the left side surface of the vehicle 1, which corresponds to the partial structure 10a.

First, the collision position detector 30 predicts which portion (range) of the vehicle 1 collides with the pole 2. Here, when the collision position detector 30 cannot predict a collision position, or when it is too late to predict a collision position, the collision position detector 30 detects the position of the vehicle 1 colliding with the pole 2.

Then, the collision position detector 30 determines which of the partial structures 10a to 10t corresponds to the predicted or detected collision position. As a result, the collision position detector 30 determines the partial structure 10*a* as a target to be actuated. Next, the collision position detector 30 outputs information on the partial structure 10*a* as the target to be actuated to the ECU 50.

Upon receiving the information on the partial structure 10*a* to be actuated from the collision position detector 30, the ECU 50 actuates the inflator 20, and causes the selector 40 to select the partial structure 10*a* as the destination of the gas supply from the inflator 20. Here, when the targeted partial structure is one, for example, the partial structure 10*a* as the present implementation, the ECU 50 controls the inflator 20 and the selector 40 to maximally expand the partial structure deformation part 111*b* of the targeted partial structure 10*a*.

By this means, the inflator 20 is actuated to output the gas to the selector 40. Then, the selector 40 allows the gas from the inflator 20 to be supplied to the partial structure 10*a*.

In the partial structure 10*a*, the gas from the inflator 20 is outputted via the selector 40, and is supplied to the partial structure chamber 111*a* via the gas supply hole 111*c*. When the gas is supplied to the partial structure chamber 111*a*, the pressure in the partial structure chamber 111*a* is increased to press the partial structure deformation part 111*b*.

Then, when the pressure in the partial structure chamber 111*a* is equal to or higher than a predetermined value, the bellows of the partial structure deformation part 111*b* expand so that the partial structure deformation part 111*b* blows up outward in the vehicle width direction and protrudes from the outer periphery of the vehicle 1, as illustrated in FIG. 4. Accordingly, when the vehicle 1 collides with the pole 2, the protruding partial structure deformation part 111*b* of the partial structure 10*a* contacts the pole 2 to absorb the impact of the collision. In this way, the partial structure 10*a* can absorb the impact of the collision of the vehicle 1 with the pole 2.

Meanwhile, when the vehicle 1 collides with the pole 2 at a different position of the vehicle 1, it is possible to actuate only the targeted one of the partial structures 10*a* to 10*t*. Therefore, it is possible to effectively absorb the impact of the collision with the pole 2 over a wide range by using the inflator 20 having a volume for actuating only one targeted partial structure among the many partial structures 10*a* to 10*t*.

<Motion of Safety Apparatus in Collision with Barrier>

Figure 5:
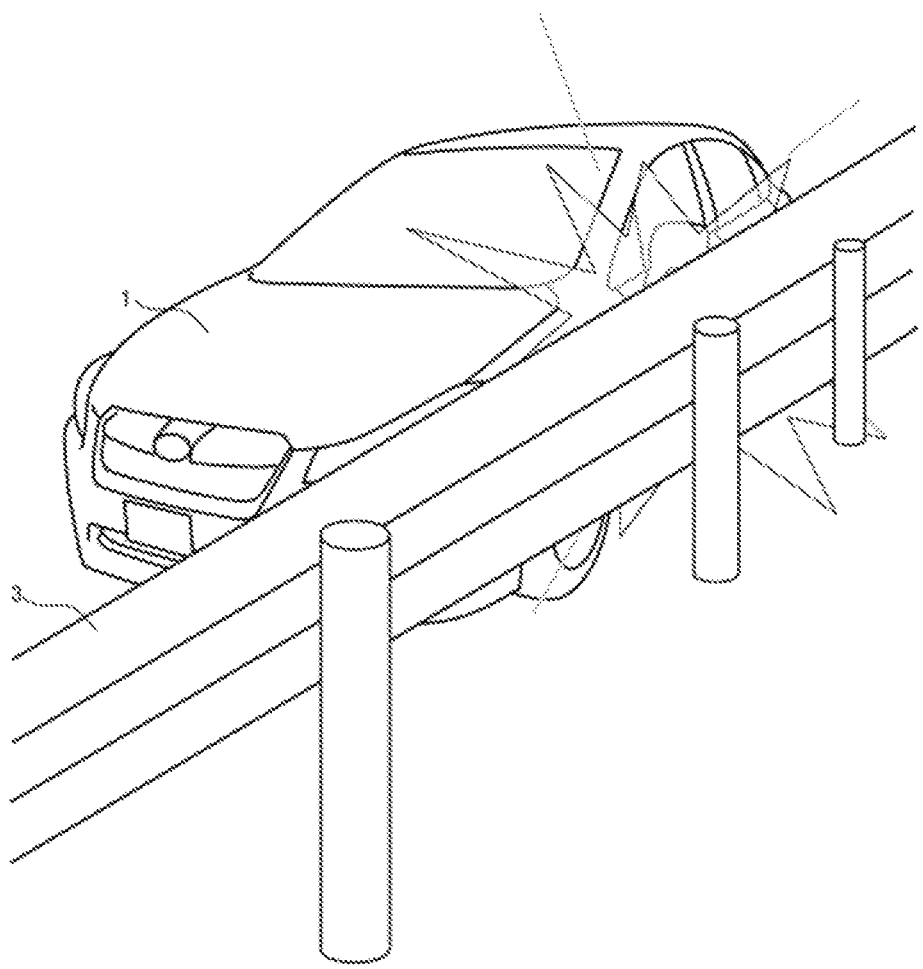
FIG. 5 is a perspective view illustrating a state where the vehicle collides with a barrier.
Figure 6A:
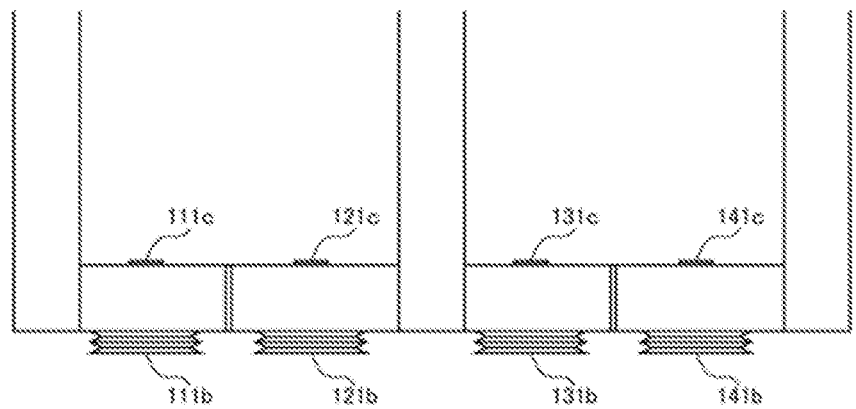
FIGS. 6A-6B are plan views illustrating a plurality of targeted partial structures before and after they are actuated.
Figure 6B:
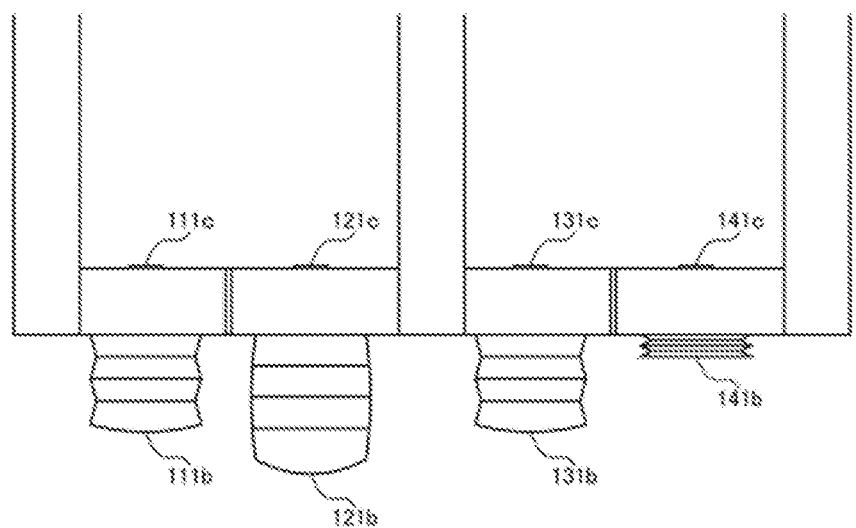

Next, the motion of the safety apparatus when the vehicle 1 collides with an object in a predetermined range of the vehicle 1 will be described. With the present implementation, a case where the vehicle 1 collides with a guardrail or a barrier will be described. FIG. 5 is a perspective view illustrating a state where the vehicle 1 collides with a barrier 3. FIGS. 6A-6B are plan views illustrating a part of the structure 10 before and after the targeted partial structures 10*a* to 10*c* are actuated.

As illustrated in FIG. 5, the vehicle 1 collides with the barrier 3 not at a certain point but in a predetermined range of the vehicle 1. With the present implementation, note that the vehicle 1 collides with the barrier 3 in a predetermined range of the left side surface of the vehicle 1, which corresponds to the partial structures 10*a* to 10*c*.

Like the partial structures 10*a* and 10*b*, the partial structure 10*c* includes a partial structure chamber 131*a*. A partial structure deformation part 131*b* is attached to the partial structure chamber 131*a* and a gas supply hole 131*c* is formed in the partial structure chamber 131*a*. Here details of each part of the partial structure 10*c* are the same as those of the partial structures 10*a* and 10*b*, and therefore the description is omitted.

First, the collision position detector 30 predicts which portion (range) of the vehicle 1 collides with the barrier 3. Here, when the collision position detector 30 cannot predict a collision position, or when it is too late to predict a collision position, the collision position detector 30 detects the position of the vehicle 1 colliding with the barrier 3.

The collision position detector 30 determines which of the partial structures 10*a* to 10*t* corresponds to the predicted or detected collision position. As a result, the collision position detector 30 determines the partial structures 10*a* to 10*c* as targets to be actuated. In addition, when the collision position corresponds to more than one of the partial structures 10*a* to 10*t* as the present implementation, the collision position detectors 30 also predicts or detects the magnitude of the collision at the point corresponding to each of the partial structures 10*a* to 10*t*. Next, the collision position detector 30 outputs information on the partial structures 10*a* to 10*c* as the targets to be actuated to the ECU 50.

Upon receiving the information on the partial structures 10*a* to 10*c* to be actuated from the collision position detector 30, the ECU 50 actuates the inflator 20, and causes the selector 40 to select the partial structures 10*a* to 10*c* as the destination of the gas supply from the inflator 20. Here, when the magnitude of the collision at the point corresponding to each of the partial structures 10*a* to 10*c* is predicted or detected, the ECU 50 controls the inflator 20 and the selector 40 to adjust the amount of gas supplied to the partial structures 10*a* to 10*c*, according to the magnitude of the collision. For example, when the magnitude of the collision at the point corresponding to the partial structure 10*b* is greater than those of the partial structures 10*a* and 10*c*, the ECU 50 controls the inflator 20 and the selector 40 to maximally expand the partial structure deformation part 121*b* of the partial structure 10*b* and to supply the remaining gas to the partial structures 10*a* and 10*c*.

By this means, the inflator 20 is actuated to output the gas to the selector 40. Then, the selector 40 allows the partial structures 10*a* to 10*c* to be supplied with appropriate amounts of the gas from the inflator 20.

In the partial structures 10*a* to 10*c*, the gas from the inflator 20 is outputted via the selector 40, and is supplied to the partial structure chambers 111*a* to 131*a* via the gas supply holes 111*c* to 131*c*. When the gas is supplied to the partial structure chambers 111*a* to 131*a*, the pressure in the partial structure chambers 111*a* to 131*a* is increased to press the partial structure deformation parts 111*b* to 131*b*.

Then, when the pressure in the partial structure chambers 111*a* to 131*a* is equal to or higher than a predetermined value, the bellows of the partial structure deformation parts 111*b* to 131*b* expand so that the partial structure deformation parts 111*b* to 131*b* blow up, as illustrated in FIGS. 6A-6B. The partial structure deformation part 121*b* of the partial structure 10*b* maximally blows up and protrudes from the outer periphery of the vehicle 1. Accordingly, when the vehicle 1 collides with the barrier 3, the protruding partial structure deformation parts 111*b* to 131*b* of the partial structures 10*a* to 10*c* contact the barrier 3 to absorb the impact of the collision. In addition, when the impact of the collision is large, particularly in the vicinity of the partial structure 10*b*, the partial structure deformation part 121*b* of the partial structure 10*b* maximally blows up, and therefore it is possible to effectively absorb the impact. In this way, the partial structures 10*a* to 10*c* can absorb the impact of the collision of the vehicle 1 with the barrier 3.

When the vehicle 1 collides with the barrier 3 in a different position of the vehicle 1, it is possible to actuate the targeted ones of the partial structures 10*a* to 10*t*. Therefore, it is possible to effectively absorb the impact of the collision with the barrier 3 over a wide range by using the inflator 20 having a volume for actuating only the targeted partial structures 10a to 10c among the many partial structures 10a to 10t.

<Another Implementation of Partial Structure>

Next, another implementation of the partial structure will be described. Here, FIGS. 7A-7B are plan views illustrating the another implementation of the partial structure as part of the structure 10.

Here, with the above-described implementation, the shape of the side surfaces of the partial structure deformation part 111b of the partial structure 10a is like bellows. However, as the another implementation of the partial structure, the shape may be changed.

For example, with the above-described implementation, the side surface of the partial structure deformation part 111b is folded several times as bellows. However, with the present implementation, this side surface may be folded only once. To be more specific, the side surface of the partial structure deformation part 111b has a shape where two trapezoids are stacked in the opposite directions when viewed from above or the side.

Figure 7A:
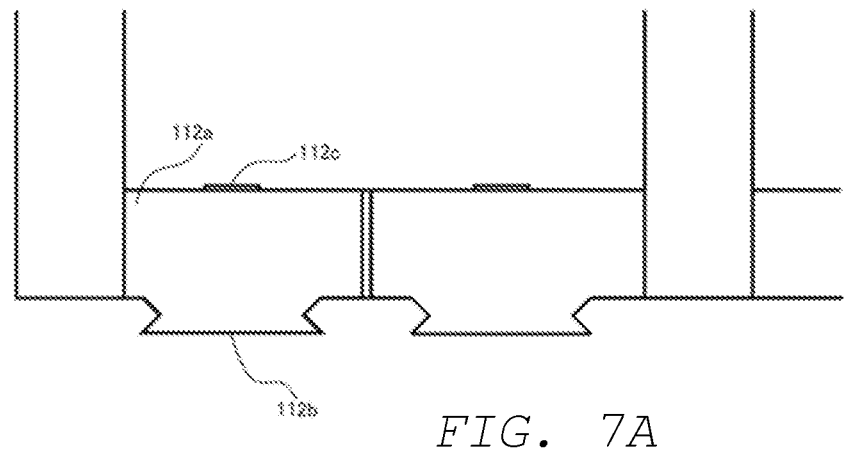
FIGS. 7A-7B are plan views illustrating the partial structure according to another example.
Figure 7B:
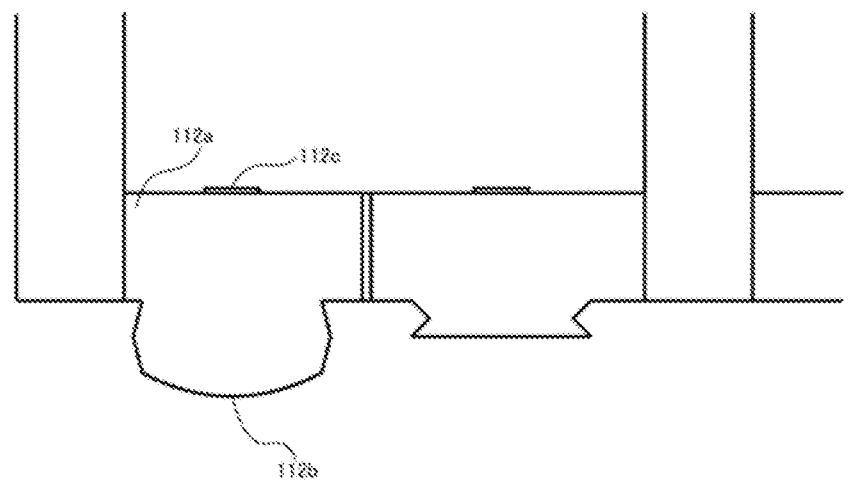

To be more specific, as illustrated in FIGS. 7A-7B, one of the trapezoids has a long upper base and a short lower base, and the other trapezoid has a short upper base and a long lower base. The short lower base is confronted with the short upper base, and the long upper base is provided from an opening formed in the side surface of the partial structure chamber 112a facing the outer periphery of the vehicle 1. With this implementation, the partial structure deformation part 112b is deformed and protrudes outward in the vehicle width direction, so that it is possible to absorb the impact of the collision with an object.

<Partial Structure Deformation Part as Concave Portion in Partial Structure Chamber>

Figure 8A:
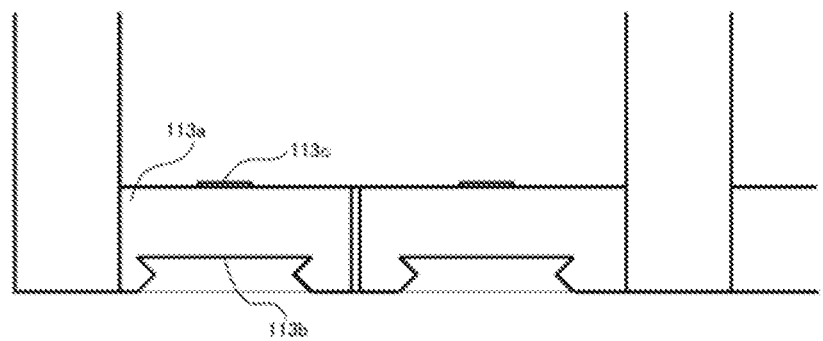
FIGS. 8A-8B are plan views illustrating an example of a partial structure having a partial structure deformation part formed as a concave portion.
Figure 8B:
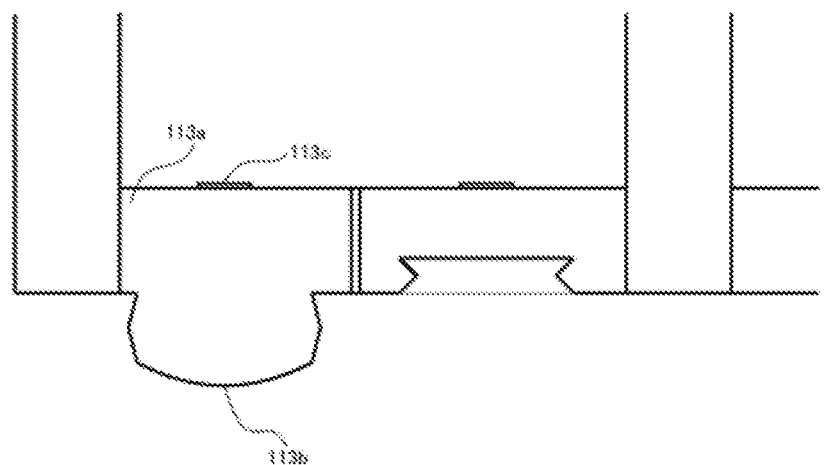

Next, a case where the partial structure deformation part is formed as a concave portion in the partial structure chamber will be described. FIGS. 8A-8B are plan views illustrating an implementation of the partial structure having the partial structure deformation part formed as a concave portion as part of the structure 10.

As illustrated in FIGS. 8A-8B, the partial structure according to the present implementation includes a partial structure chamber 113a. A partial structure deformation part 113b is attached to the partial structure chamber 113a and a gas supply hole 113c is formed in the partial structure chamber 113a.

The partial structure chamber 113a includes a concave portion dented from the side surface facing the outer periphery of the vehicle 1. The concave portion is dented inward from the side surface of the structure 10. Meanwhile, the gas supply hole 113c is formed in the opposite side surface inside the vehicle 1.

The partial structure deformation part 113b is provided in the side surface of the partial structure chamber 113a facing the outer periphery of the vehicle 1 such that part of the side surface is folded inward. As the pressure in the partial structure chamber 113a is increased, the partial structure deformation part 113b is pushed out from the partial structure chamber 113a, and can protrude over the outer periphery of the vehicle 1 to outside the vehicle 1. Here, the shape of the side surfaces of the partial structure deformation part 113b may be like bellows.

The gas supply hole 113c is coupled to the selector 40 via the gas supply line. By this means, the destination of the gas supply is selected by the selector 40, so that it is possible to supply the gas to the partial structure chamber 113a via the gas supply hole 113c.

As described above, the ECU 50 controls the inflator 20 and the selector 40 to supply the gas to the partial structure chamber 113a via the gas supply hole 113c. The partial structure deformation part 113b is pushed out from the partial structure chamber 113a by the pressure in the partial structure chamber 113a, so that the partial structure deformation part 113b protrudes over the outer periphery of the vehicle 1 to outside the vehicle 1. By this means, it is possible to effectively absorb the impact of the collision with an object.

<Partial Structure Deformation Part as Separated Part>

Figure 9A:
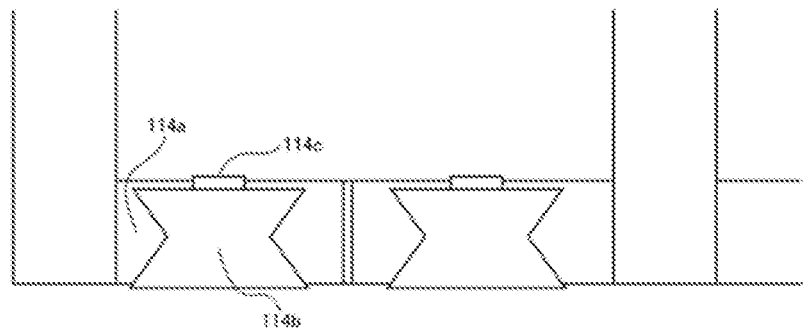
FIGS. 9A-9B are plan views illustrating an example of a partial structure having a separated partial structure deformation part.
Figure 9B:
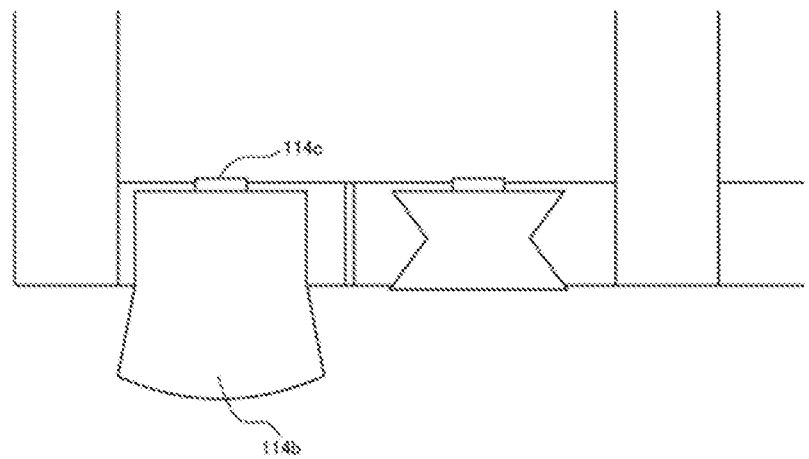

Next, a case where the partial structure deformation part as a separated part is deformed will be described. FIGS. 9A-9B are plan views illustrating an implementation of the partial structure having the partial structure deformation part as a separated part as part of the structure 10.

As illustrated in FIGS. 9A-9B, the partial structure according to the present implementation includes a partial structure chamber 114a. A partial stricture deformation part 114b is stored in the partial structure chamber 114a, and a gas supply hole 114c is formed for the partial structure deformation part 114b.

An opening is formed in the side surface of the partial structure chamber 114a, which faces the outer periphery of the vehicle 1, the partial structure chamber 114a forms a desired room in the structure 10. Meanwhile, a hole connecting to the gas supply hole 114c is formed in the opposite side surface of the partial structure chamber 114a inside the vehicle 1.

The partial structure deformation part 114b is stored in the partial structure chamber 114a. The side surface of the partial structure deformation part 114b facing the outer periphery of the vehicle 1 slightly protrudes outward from the opening of the partial structure chamber 114a, and a hole connecting to the gas supply hole 114c is formed in the opposite side surface of the partial structure deformation part 114b.

Part of the side surfaces of the partial structure deformation part 114b is folded inward. Then, when the gas is supplied to the partial structure deformation part 114b and the pressure in the partial structure deformation part 114b is increased, the side surfaces of the partial structure deformation part 114b expand outward in the vehicle width direction, so that the partial structure deformation part 114b can protrude over the outer periphery of the vehicle 1 to outside the vehicle 1. Here, the shape of the side surfaces of the partial structure deformation part 114b may be like bellows.

The gas supply hole 114c is formed in part of the structure 10, and allows the holes formed in the partial structure chamber 114a and the partial structure deformation part 114b to communicate with the outside of the structure 10. The gas supply hole 114c is coupled to the selector 40 via the gas supply line. By this means, the destination of the gas supply is selected by the selector 40, so that it is possible to supply the gas to the partial structure deformation part 114b via the gas supply hole 114c.

As described above, the ECU 50 controls the inflator 20 and the selector 40 to supply the gas from the inflator 20 to the partial structure deformation part 114b via the gas supply hole 114c. By this means, the partial structure deformation part 114b blows up, and part of the side surfaces of the partial structure deformation part 114b which is folded inward expands, so that the partial structure deformation part 114b protrudes from the partial structure chamber 114a outward in the vehicle width direction and protrudes over the outer periphery of the vehicle 1 to outside the vehicle 1. As a result, it is possible to effectively absorb the impact of the collision with an object.

<Another Shape of Partial Structure Deformation Part>

Figure 10A:
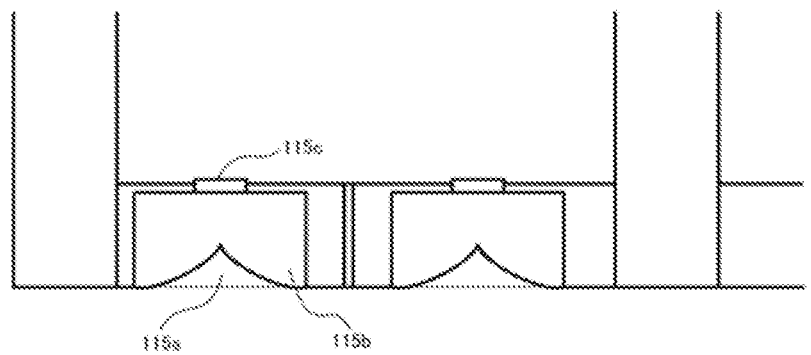
FIGS. 10A-10B are plan views illustrating an example of partial structure having a partial structure deformation part in a different shape.
Figure 10B:
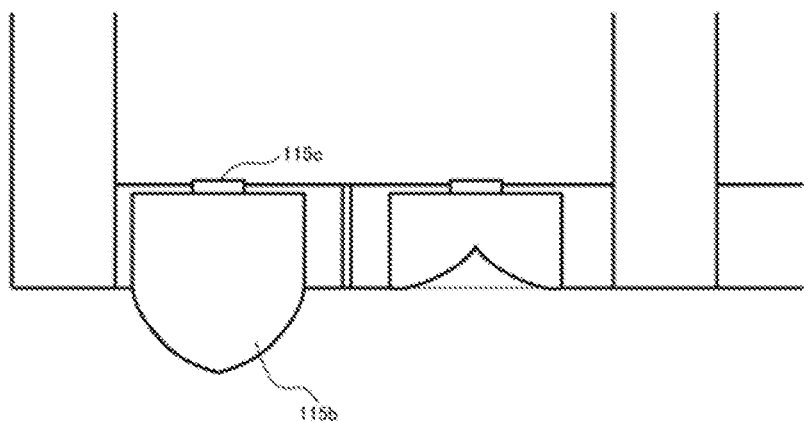

Next, a case where the shape of the partial structure deformation part is different from that of the above-described partial structure deformation part 114*b* will be described. FIGS. 10A-10B are plan views illustrating an implementation of the partial structure having the partial structure deformation part formed in a different shape as part of the structure 10.

As illustrated in FIGS. 10A-10B, the partial structure according to the present implementation includes a partial structure chamber 115*a*. A partial structure deformation part 115*b* is stored in the partial structure chamber 115*a*, and a gas supply hole 115*c* is formed for the partial structure deformation part 115*b*.

Like the above-described partial structure chamber 114*a*, an opening is formed in the side surface of the partial structure chamber 115*a*, which faces the outer periphery of the vehicle 1, and the partial structure chamber 115*a* forms a desired room in the structure 10. Meanwhile, a hole connecting to the gas supply hole 115*c* is formed in the opposite side surface of the partial structure chamber 115*a* inside the vehicle 1.

The partial structure deformation part 115*b* is stored in the partial structure chamber 115*a*. The side surface of the partial structure deformation part 115*b* which corresponds to the outer periphery of the vehicle 1 is folded inward. Meanwhile, a hole connecting to the gas supply hole 115*c* is formed in the opposite side surface of the partial structure deformation part 115*b*.

The side surfaces of the partial structure deformation part 115*b* are provided along the side surfaces of the partial structure chamber 115*a*. Then, when the gas is supplied to the partial structure deformation part 115*b* and the pressure in the partial structure deformation part 115*b* is increased, the folded side surface of the partial structure deformation part 115*b* expands outward in the vehicle width direction, so that the partial structure deformation part 115*b* can protrude over the outer periphery of the vehicle 1 to outside the vehicle 1. Here, the shape of the folded side surface of the partial structure deformation part 115*b* may be like bellows.

Like the gas supply hole 114*c*, the gas supply hole 115*c* is formed in part of the structure 10, and allows the holes formed in the partial structure chamber 115*a* and the partial structure deformation part 115*b* to communicate with the outside of the structure 10. The gas supply hole 115*c* is coupled to the selector 40 via the gas supply line. By this means, the destination of the gas supply is selected by the selector 40, so that it is possible to supply the gas to the partial structure deformation part 115*b* via the gas supply hole 115*c*.

As described above, the ECU 50 controls the inflator 20 and the selector 40 to supply the gas from the inflator 20 to the partial structure deformation part 115*b* via the gas supply hole 115*c*. By this means, the pressure in the partial structure deformation part 115*b* is increased to blow up the partial structure deformation part 115*b*, and the folded side surface of the partial structure deformation part 115*b* expands from the partial structure chamber 115*a* outward in the vehicle width direction, and protrudes from the outer periphery of the vehicle 1. As a result, it is possible to effectively absorb the impact of the collision with an object.

As described above, the safety apparatus for the vehicle 1 according to the implementations includes: the inflator 20 configured to supply gas; the collision position detector 30 configured to detect or predict the position of the collision of the vehicle 1 with an object; the selector 40 configured to select the destination of the gas supply from the inflator 20 from among the partial structures 10*a* to 10*t*; and the ECU 50 configured to control the destination of the gas supply selected by the selector 40, based on the collision position detected or predicted by the collision position detector 30. Therefore, it is possible to supply the gas from the inflator 20 only to the partial structures 10*a* to 10*t* corresponding to the collision position. As a result, it is possible to effectively absorb the impact of the collision with an object over a wide range by using the compact inflator.

In addition, with the safety apparatus for the vehicle 1 according to the above-described implementations, the partial structures 10*a* to 10*t* are deformed to deploy to protrude over the outer periphery of the vehicle 1, and therefore it is possible to effectively absorb the impact of the collision with an object.

Moreover, with the safety apparatus for the vehicle 1 according to the above-described implementations, the gas is supplied from the inflator 20 to the partial structures 10*a* to 10*t* such that the partial structure deformation parts 111*b* to 115*b* of the partial structures 10*a* to 10*t* corresponding to the collision position maximally expand, and therefore it is possible to effectively absorb the impact of the collision with an object.

Moreover, with the safety apparatus for the vehicle 1 according to the above-described implementations, when the collision position corresponds to more than one of the partial structures 10*a* to 10*t*, the gas is supplied from the inflator 20 to deploy the corresponding partial structures as large as possible. Therefore, it is possible to effectively absorb the impact of the collision with an object over a wide range by using the compact inflator 20.

Furthermore, with the safety apparatus for the vehicle 1 according to the above-described implementations, when the impact position detector 30 predicts or detects the collision position corresponding to the plurality of partial structures 10*a* to 10*t*, the impact position detector 30 also predicts or detects the magnitude of the collision at the point corresponding to each of the partial structures 10*a* to 10*t*. Then, the ECU 50 controls the amount of gas for each of the partial structures 10*a* to 10*t*, based on the prediction or the detection by the collision position detector 30. Therefore, it is possible to effectively absorb the impact of the collision with an object by using the compact inflator 20.

Furthermore, with the above-described implementations, the selector 40 and the ECU 50 constitute a deployment controller.

Here, with the above-described implementations, the partial structures 10*a* to 10*t* are disposed in the vehicle 1 in all directions. However, this is by no means limiting, and the partial structures 10*a* to 10*t* may be disposed in specific positions. For example, the partial structures 10*a* to 10*h* may be disposed, but the partial structures 10*i* to 10*t* may not be disposed in FIG. 1.

Moreover, with the above-described implementations, the collision position detector 30 predicts and detects the position of the collision with an object. However, this is by no means limiting, and the collision position detector 30 may either predict or detect the collision position.

The invention claimed is:

1. A safety apparatus for a vehicle comprising:
 a structure extending along an outer periphery of the vehicle, the structure including partial chambers formed inside the structure, each as an independent room, and the partial chambers each having formed or fixed thereto a deformation unit on an opening of the partial chamber, and the deformation units being configured for outward deployment in a vehicle width direction;

an inflator configured to supply gas into the partial chambers;

a collision position detector configured to detect or predict a collision position of the vehicle upon colliding against an object; and a deployment controller configured to control gas supply from the inflator to the partial chambers, on a basis of the collision position detected or predicted by the collision position detector, wherein the deployment controller is configured to cause the inflator to supply the gas to one or more of the partial chambers corresponding to the collision position to deploy the deformation unit of the one or more of the partial chambers outward in the vehicle width direction.

2. The safety apparatus for a vehicle according to claim 1, wherein each deformation unit that is selected for gas supply is deformed to deploy over an outer periphery of the vehicle to outside the vehicle.

3. The safety apparatus for a vehicle according to claim 1, wherein the deployment controller is configured to have the inflator provide gas to the deformation units to achieve different levels of deformation unit expansion, including a maximum expansion level option, and the deployment controller causes the inflator to supply the gas to one or more of the deformation units corresponding to the collision position to the maximum expansion level.

4. The safety apparatus for a vehicle according to claim 2, wherein the deployment controller is configured to have the inflator provide gas to the deformation units to achieve different levels of deformation unit expansion, including a maximum expansion level option, and the deployment controller causes the inflator to supply the gas to one or more of the deformation units corresponding to the collision position to the maximum expansion level.

5. The safety apparatus for a vehicle according to claim 1, wherein, when the collision position of the vehicle relative to an object extends along a plurality of partial chambers, the deployment controller causes the inflator to supply the gas to the corresponding partial chambers at the collision position to deploy the corresponding partial chambers as large as possible.

6. The safety apparatus for a vehicle according to claim 2, wherein, when the collision position of the vehicle relative to the object extends along a plurality of the partial chambers, the deployment controller causes the inflator to supply the gas to the corresponding partial chambers at the collision position to deploy the corresponding partial chambers as large as possible.

7. The safety apparatus for a vehicle according to claim 1, wherein:

when the collision position of the vehicle relative to the object extends along a plurality of the partial chambers, the collision position detector detects or predicts a magnitude of a collision at a point corresponding to each of the plurality of partial chambers; and the deployment controller controls an amount of the gas for each of the plurality of partial chambers, based on the detection or the prediction by the collision position detector.

8. The safety apparatus for a vehicle according to claim 2, wherein:

when the collision position of the vehicle relative to the object extends along a plurality of the partial chambers, the collision position detector detects or predicts a magnitude of a collision at a point corresponding to each of the plurality of partial chambers; and the deployment controller controls an amount of the gas for each of the plurality of partial chambers, based on the detection or the prediction by the collision position detector.

9. The safety apparatus for a vehicle according to claim 5, wherein:

when the collision position of the vehicle relative to the object extends along a plurality of the partial chambers, the collision position detector detects or predicts a magnitude of a collision at a point corresponding to each of the plurality of partial chambers; and the deployment controller controls an amount of the gas for each of the plurality of partial chambers, based on the detection or the prediction by the collision position detector.

10. The safety apparatus for a vehicle according to claim 6, wherein:

when the collision position of the vehicle relative to the object extends along a plurality of the partial chambers, the collision position detector detects or predicts a magnitude of a collision at a point corresponding to each of the plurality of partial chambers; and the deployment controller controls an amount of the gas for each of the partial chambers, based on the detection or the prediction by the collision position detector.

11. A safety apparatus for a vehicle comprising:

a structure extending along an outer periphery of the vehicle, the structure including partial chambers formed inside the structure, each as an independent room, and the partial chambers each having formed or fixed thereto a deformation unit on an opening of the partial chamber, and the deformation units being configured for outward deployment in a vehicle width direction;

an inflator configured to supply gas into the partial chambers; and circuitry configure to detect or predict a collision position of the vehicle upon colliding against an object, and control gas supply from the inflator to the partial chambers, on a basis of the collision position detected or predicted by the collision position detector, wherein the circuitry causes the inflator to supply the gas to one or more of the partial chambers corresponding to the detected collision position to deploy the deformation unit of the one or more of the partial chambers outward in the vehicle width direction.

12. A safety apparatus for a vehicle, comprising:

a structure extending along an outer periphery of the vehicle, the structure including partial chambers each formed inside the structure as to define independent room interiors within the structure;

a plurality of deformation units respectively fixed to, or positioned within, the partial chambers, each deformation unit is configured to extend outward away from a periphery of the vehicle upon deployment;

an inflator configured to supply gas to the deformation units through respective gas supply openings provided in the partial chambers;

a collision position detector configured to detect or predict a collision position of the vehicle upon colliding against an object; and a deployment controller configured to control gas supply from the inflator to the partial chambers, on a basis of the collision position detected or predicted by the collision position detector, wherein the deployment controller is configured to cause the inflator to selectively supply the gas to only one or a sub-set of all partial chambers in gas communication with the inflator, with the only one or the sub-set of partial chambers being those corresponding with the collision position such that each selected deformation unit deploys outward away from the outer periphery of the vehicle.

13. The safety apparatus for a vehicle according to claim 12, wherein the deployment controller is configured to have the inflator provide gas to the deformation units to achieve different levels of deformation unit expansion, including intermediate and maximum expansion levels, and the deployment controller causes the inflator to supply the gas to one or more deformation units determined by the deployment controller to be most impacted by the collision to the maximum expansion level and to supply gas at the intermediate expansion level to a remaining one or more of the deformation units deemed to correspond with the collision position.

14. The safety apparatus for a vehicle according to claim 12, wherein the deployment controller is configured to have the inflator provide gas to only a single selected deformation unit amongst the plurality of deformation units in potential communication with the inflator, when the collision position is determined to correspond to only the partial chamber associated with that single selected deformation unit.

15. The safety apparatus for a vehicle according to claim 12, wherein the deployment controller is configured to have the inflator provide gas to only a sub-set of selected deformation units amongst the entire plurality of deformation units in potential communication with the inflator, when the collision position is determined to correspond to only a region of the vehicle corresponding with those partial chambers corresponding with the selected sub-set of deformation units.

16. The safety apparatus for a vehicle according to claim 12, wherein there is a set of partial chambers spaced along one lateral peripheral side of the vehicle and a set of partial chambers spaced along an opposite lateral peripheral side of the vehicle, and the inflator is in communication with each of the partial chambers in each set such that the deformation units are configured, when selectively deployed, to extend outward in the vehicle width direction.

17. The safety apparatus for a vehicle according to claim 1, wherein there is a set of partial chambers spaced along one lateral peripheral side of the vehicle and a set of partial chambers spaced along an opposite lateral peripheral side of the vehicle, and the inflator is in communication with each of the partial chambers in each set such that the deformation units are configured, when selectively deployed, to extend outward in the vehicle width direction.

18. The safety apparatus for a vehicle according to claim 11, wherein there is a set of partial chambers spaced along one lateral peripheral side of the vehicle and a set of partial chambers spaced along an opposite lateral peripheral side of the vehicle, and the inflator is in communication with each of the partial chambers in each set such that the deformation units are configured, when selectively deployed, to extend outward in the vehicle width direction.

* * * * *